United States Patent Office 3,088,928
Patented May 7, 1963

3,088,928
NOVEL EMULSIFIABLE WAXY LINEAR
POLYESTERS
Clifford R. Berres, Georges E. Tabet, and Edward A. Wilder, Racine, Wis., assignors to S. C. Johnson & Son, Inc., Racine, Wis.
No Drawing. Filed Oct. 1, 1959, Ser. No. 843,642
11 Claims. (Cl. 260—29.2)

This invention relates to a new synthetic hard wax which in many applications is an adequate substitute for carnauba wax. More particularly, the invention relates to wax compositions consisting of the reaction product of certain dicarboxylic acids, aliphatic glycols and long chain monohydric alcohols.

The history of natural wax is an ancient one. Natural waxes were man's first known plastics. They have found innumerable uses in modern technological applications and have been particularly valuable in the printing and polishing industries. With the possible exception of paraffin waxes which have gained widespread use in the coating of paper and cardboard products used in the wrapper, milk packaging and related arts, carnauba wax has probably been the most important and widely used wax. This is particularly true in polishing and printing industries.

As is well known, carnauba wax originates on the leaves of the carnauba palm tree grown most extensively in Brazil. It is harvested by removing the lofty branches of the carnauba palm and thrashing the wax from these branches by mechanical agitation which has ranged from tramping or beating the leaves to processing them in mechanical devices such as that disclosed in Brazilian Patent No. 77,427. Carnauba wax is expensive because of the tedious method of harvesting it and it varies in quality depending upon the locality in which it is harvested, the season, and the method employed in its harvest. It is only because of its extreme value and the uniqueness of its properties that it has enjoyed high commercial success for decades.

It has long been the goal of those engaged in the wax polish industry and the chemical industry supplying the wax polish industry to produce a synthetic wax which has all or most of the attributes of carnauba wax. Several attempts have been made, without success, to accomplish this result. A satisfactory product must have a high softening point, one in excess of 80° C. It is also essential that it have a low melt viscosity. That is, it should flow readily at a temperature slightly in excess of its softening point to facilitate blending and pouring of the wax base in emulsion polish preparation and to permit the retention of volatile emulsifying agents used in such systems. To be a successful substitute for carnauba wax in a substantial segment of the wax polish industry, a synthetic wax must be readily emulsified so that it can be employed in aqueous wax emulsions. Such emulsions must dry to a bright lustrous finish when spread in films or must be readily buffed to such a finish.

It is an object of this invention to produce a new synthetic hard wax which has the foregoing attributes and one which can be readily and economically produced to compete with carnauba wax.

The above and other objects have been achieved by the discovery of new polyester compositions which comprise the reaction product of a non-branched polymethylene dicarboxylic acid having between 4 and about 15 carbon atoms, a non-branched polymethylene glycol having between 4 and about 15 carbon atoms and a non-branched saturated aliphatic monohydric alcohol having between 26 and 45 carbon atoms, and preferably between about 30 and about 45 carbon atoms. This reaction product will be recognized as a linear polyester terminating with a long chain aliphatic alcohol of the length specified. The term linear polyester as used herein means a polyester of the components specified containing only carbon, hydrogen and oxygen and being substantially free from cyclic, branched alkyl, and unsaturated groups. These products must have a molecular weight of between about 1200 and about 6000 and preferably between 1500 and 4500. They are readily emulsified in conventional wax emulsion systems, have an acid value of between about 10 and about 50, preferably between 12 and about 35, a softening point of at least 80° C., and not greater than about 120° C., and a needle penetration value not greater than 5. They must flow readily at temperatures immediately above their softening point. An acid value in about the range specified is essential to permit ready emulsification of the compositions. A lesser acid value does not permit complete emulsification and compositions having a greater acid value produce alkali sensitive films or films which have a tendency to bloom due to an excess of emulsifier associated with the large number of carboxyl groups.

The glycols which may be employed in the invention contain between 4 and about 15 carbon atoms and are represented by the following non-branched polymethylene glycols which are readily available: 1,4 butanediol; 1,6 hexanediol; 1,8 octanediol; 1,10 decanediol and 1,12 dodecanediol. Other diols of this series are operable, but are not as readily available as those recited. Operable acids are the non-branched alkylene dibasic acids having between 4 and about 15 carbon atoms. These are represented by succinic ($C_4$), glutaric ($C_5$), adipic ($C_6$), pimelic ($C_7$), suberic ($C_8$), azelaic ($C_9$), sebacic ($C_{10}$), and brassylic ($C_{13}$), acids. Mixtures of glycols and mixtures of dicarboxylic acids may be used in the invention.

Suitable long chain monohydric alcohols are saturated straight chain aliphatic alcohols having between 26 and about 45 carbon atoms. These are represented by the long chain alcohols marketed by Continental Oil Company under the tradename Alfol 32 and Alfol 34. Alfol 32 is a mixture of saturated straight chain hydrocarbon monohydric alcohols having the following approximate composition: 3% alcohols below $C_{26}$; 91% alcohols between $C_{26}$ and $C_{40}$; 7% alcohols above $C_{40}$. It melts at between 79 to 91° C. The significance of the number 32 is that there are more molecules in the mixture containing 32 carbon atoms than any other length. Alfol 34 is a companion product consisting primarily of saturated straight chain hydrocarbon monohydric alcohols as follows: 3% alcohols below $C_{28}$; 91% alcohols between $C_{28}$ and $C_{42}$; 7% alcohols above $C_{42}$. There are more $C_{34}$ carbon atom molecules than of any other length. It melts at approximately 78–92° C. Also useful in the invention are the linear saturated aliphatic monohydric alcohols having from 26–30 carbon atoms which are extractable from certain plant excretions; for example, from the unsaponifiable portion of carnauba wax. The specified long chain alcohols may be used alone or as mixtures. When mixtures of alcohols are used the molecules comprising the mixture should have an average length of at least 26 carbon atoms with not more than about 5% of the molecules having less than 26 carbon atoms. Preferably the average alcohol molecule will contain at least about 30 carbon atoms with not more than about 10% of the molecules having less than 30 carbon atoms.

The ratio of dicarboxylic acids, glycols and long chain monohydric alcohols should be such that the polymer molecules of the new emulsifiable synthetic wax compositions are terminated predominantly with carboxyl and alkyl groups in substantially equal proportions. This is accomplished by combining the dicarboxylic acid, glycol and monohydric alcohol in molar proportions of $n$ mols of glycol, $n+1$ mols of dicarboxylic acid and 1 mol of long chain monohydric alcohol where $n$ has a value of from 2 to 30 and represents the number of repeating glycol and dicarboxylic residues in the finished polyester, the specific value of which is determined by the molecular weight of the monomers, terminating alcohol, desired molecular weight and acid value of the final product.

Ordinary polyesters prepared by reacting polymethylene glycols and polymethylene dicarboxylic acids of the type specified do not produce compositions comparable to those contemplated by the present invention. Further the reaction product of these glycols and dicarboxylic acids with monohydric alcohols having a chain length of less than 26 carbon atoms, do not have the unique characteristics possessed by the compositions herein contemplated. The present compositions containing long chain monohydric alcohol residues are particularly unique and have characteristics which are especially preferred over polyesters prepared from dicarboxylic acids, glycols and monohydric alcohols having a lesser chain length. Compositions produced in accordance with the principles of the present invention are unsuitable for the purposes contemplated if the glycol and dicarboxylic acid portions of the polyesters are branched, cyclic or unsaturated. The compositions of the present invention are waxy but are non-resinous in the sense that they are not brittle and permit buffing to produce an appropriate luster.

They do not tear when buffed. They have many uses, but their greatest immediate use is in the formulation of wax coating and finishing compositions of the water emulsion type.

A number of specific examples are presented in Table 1 in tabular form together with characterizing data and information on the nature of emulsions and films formed with emulsions prepared from each of the examples.

In each example the quantity of monohydric alcohol, glycol, and dicarboxylic used is stated in grams. In the preparation of the compositions of the invention, these quantities of material were charged to a 3-neck round bottom flask of adequate capacity equipped with a thermometer, mechanical agitator, water trap and reflux condenser. A quantity of xylene representing approximately 10% of the weight of the principal reactants was added to the flask as an azeotroping solvent. Heat was applied, raising the temperature to that indicated in the examples and continued for the period of time disclosed. The lower temperature represents the initial reaction temperature. The temperature was gradually raised to the upper limit as the water of reaction was evolved and collected in the water trap. The resulting products had the molecular weights indicated calculated on the basis of the acid number observed. After the reaction was completed, the xylene was removed from the system by stripping at a temperature of about 150° C. at reduced pressure using an aspirator. The products were then poured into metal containers and permitted to solidify after which the characterizing data was determined and emulsions prepared.

Softening points as used in these examples and throughout this specification were determined by the Durran's mercury method (Journal of Oil and Colour Chemist's Association, 12, 173–5 [1929]). Needle penetration values were determined by the American Society for Testing Materials method D5–25 (Penetration of Bituminous Materials). Emulsions were prepared from each of the products using the following formula:

35.2 grams of the linear polyester
    6.0 grams oleic acid
    4.0 grams morpholine
    1.0 gram polyoxyethylene oleyl ether
    316 grams water The emulsions were spread upon test panels of linoleum, asphalt and black carrara glass and permitted to dry. The tabular data discloses the results obtained.

TABLE I

| Example | 1 | 2 | 3 | 4 | 5 | 6 | 7 |
|---|---|---|---|---|---|---|---|
| Glycol: | | | | | | | |
|   1,4-butanediol, g | | | | | | | |
|   1,6-hexanediol, g | | | | | 37.8 | | |
|   1,10-decanediol, g | | | | 38.7 | | | |
|   1,12-dodecanediol, g | 117.3 | 49.3 | 18.2 | | | | |
| Dicarboxylic acid: | | | | | | | |
|   Succinic anhydride, g | | | | | | 33.5 | |
|   Adipic acid, g | | | | | | | 188.5 |
|   Azelaic acid, g | | | | | | | |
|   Sebacic acid, g | 122.5 | 57.7 | 30.9 | 74.2 | 92.7 | 49.0 | |
| Monohydric alcohol: | | | | | | | |
|   Alfol 32, g | | 25.0 | 31.3 | 25.0 | 31.3 | | 214.4 |
|   Carnauba alcohols,[1] g | | | | | | | |
|   Alfol 34, g | 26.75 | | | | | 53.5 | 100.3 |
| Reaction conditions: | | | | | | | |
|   Time, hours | 6.5 | 10 | 7 | 8 | 8 | 3 | 6 |
|   Temperature, ° C | 155–220 | 153–225 | 139–171 | 160–250 | 150–180 | 200–210 | 145–220 |
| Characterizing data: | | | | | | | |
|   Softening point (Durran), ° C | 82.5 | 87 | 94 | 84 | 86 | 86.5 | 83.5 |
|   Needle penetration 100 g. at 5 sec. | 1 | 1 | 1.5 | 2 | 2.5 | 1.0 | 1 |
|   Average molecular weight | 5,150 | 3,080 | 1,220 | 3,150 | 2,960 | 1,770 | 3,000 |
|   Acid value | 10.9 | 18.3 | 46 | 17.8 | 19 | 31.6 | 18.7 |
|   Acid value | 10.9 | 18.2 | 46 | 20.2 | 19 | 31.6 | 18.7 |
|   Color | White | Light tan | Light tan | Light tan | Tan | Tan | Tan |
|   Texture | Hard, smooth | Hard, smooth | Hard, smooth | Hard, smooth | Hard, smooth | Hard, smooth | Hard, smooth |
|   Emulsion | Good | Good | Good | Fair-good | Good | Good | Good |
|   Film | Good gloss; buffable after scuffing. | Good gloss; buffable after scuffing. | Good gloss; buffable after scuffing. | Slight haze; gloss enhanced by buffing. | Good gloss; buffable after scuffing. | Good gloss; buffable after scuffing. | Good gloss; buffable after scuffing. |

See footnote at end of table.

TABLE I—Continued

| Example | 8 | 9 | 10 | 11 | 12 | 13 |
|---|---|---|---|---|---|---|
| Glycol: | | | | | | |
| 1,4-butanediol, g | | | | | | |
| 1,6-hexanediol, g | | | | | | 48.9. |
| 1,10-decanediol, g | 54.6 | 27.3 | 57.1 | 65.2 | 73.4 | |
| 1,12-dodecanediol, g | | | | | 40.3 | |
| Dicarboxylic acid: | | | | | | |
| Succinic anhydride, g | | | | 51.9 | | |
| Adipic acid, g | | | 63.7 | | | |
| Azelaic acid, g | | | | | | 57.2. |
| Sebacic acid, g | 72.1 | 41.2 | | | | |
| Monohydric alcohol: | | | | | | |
| Alfol 32, g | 31.3 | 31.3 | | | | 17.0. |
| Carnauba alcohols,[1] g | | | 25.0 | 25.0 | 25.0 | |
| Alfol 34, g | | | | | | 6. |
| Reaction conditions: | | | | | | |
| Time, hours | 7 | 11 | 10 | 9.5 | 9 | |
| Temperature, °C | 130–205 | 125–170 | 180–225 | 135–205 | 150–205 | |
| Characterizing data: | | | | | | |
| Softening point (Durran), °C | 86 | 87 | 75–80 | 81–84 | 84.5–86 | 85–88. |
| Needle penetration 100 g. at 5 sec. | 1.5 | 1.5 | 1.5 | 1 | 2 | 1. |
| Average molecular weight | 3,050 | 1,830 | 2,820 | 3,480 | 3,280 | 2,780. |
| Acid value | 18.4 | 30.7 | 19.9 | 16.1 | 17.1 | 20.1. |
| Acid value | 18.4 | 30.7 | 19.9 | 16.1 | 17.1 | 20.1. |
| Color | Pale yellow | Light tan | Tan | Light tan | Tan | White. |
| Texture | Hard, smooth | Hard, smooth | Hard, smooth | Hard, smooth | Hard to cryst | Hard, smo |
| Emulsion | Good | Good | Good | Good | Good | Good. |
| Film | Good gloss; buffable after scuffing. | good gloss; buffable after scuffing. | Slight haze which buffs out readily; rebuffable after scuffing. | Slight haze which buffs out readily; rebuffable after scuffing. | Slight haze eliminated by buffing; rebuffable after scuffing. | Good gloss buffable after scuffing. |

[1] A mixture of straight chain monohydric alcohols having an even number of carbon atoms, from $C_{24}$ to $C_{34}$ as follows, obtained from the nonsaponifiable portion of carnauba wax: 1% $C_{24}$; 4% $C_{24}+C_{26}$; 5% $C_{28}$; 14% $C_{30}$; 51% $C_{32}$; 22% $C_{34}$; 2%, related glycols.

In the formation of aqueous emulsions from the synthetic waxes of the invention, any of a large number of known emulsifying agents may be used. Those utilized in the formula preceding Table 1 are exemplary only. Among the emulsifiers which may be used are the alkali and alkaline earth soaps; other anionic agents such as the sulfonated oils and alkyl aryl sulfonates, nonionic agents such as diethylene glycol monolaurate, sorbitan monoleate, laurates, poly-alkylene ether alcohol, etc. Combinations of oleic or stearic acid and morpholine or other amines such as triethanol amine and amino methyl propanol are especially desirable.

It will be observed that the synthetic waxes of the above examples all melted in excess of 80° C., produced good emulsions and films which were readily buffed to a high gloss. A series of lettered examples will now be presented to show that somewhat related polyester compositions are inferior to the instantly claimed compositions in that their melting point is considerably below that of carnauba wax and the claimed compositions are softer or provide poor emulsification and film forming characteristics.

*Example (a)*

54.6 grams of 1,10 decanediol, 71.1 grams of isosebacic acid and 31.3 grams of filtered Alfol 32 were charged to a 250 ml. 3-neck round bottom flask equipped with a thermometer, mechanical agitator, and a water trap having mounted thereon a reflux condenser. 25 ml. of xylene was added thereto as an azeotroping solvent. The isosebacic acid used consisted of a mixture of 8% sebacic acid, 78% 2-ethylsuberic acid and 14% 2,5 diethyladipic acid. The temperature was raised to 168 to 212 for a period of about 9 hours, when an acid value of 21.2 was observed. Thereafter the xylene was stripped from the system by refluxing at 150 to 200° C. at reduced pressure achieved by the use of an aspirator.

The final tan colored product was tacky and infirm and had a needle penetration value of 76. The softness of the composition is attributed to the presence of ethyl substituents on the carbon atoms of the ethylsuberic and diethyladipic acid residues.

*Example (b)*

Using the technique of Example (a), 45.2 grams of 1,12 octadecanediol, 37.1 grams of sebacic acid and 18.8 grams of Alfol 32 were reacted. Like Example (a), the resulting colored product was tacky and infirm. The composition had an acid value of 18.8, molecular weight of 2980 and needle penetration value of 86. Its softening point was 78° C. Here again the tacky and infirm nature of the product is attributed to the presence of alkyl side chains ($C_6H_{13}$ groups), present on the diol residues of the polyesters.

*Example (c)*

Following the technique of Example (a) 72.8 grams of 1,10 decanediol, 92.7 grams of sebacic acid and 15.3 grams of Adol 60, a commercial mixture of about 8% stearyl alcohol, about 12% arachidyl alcohol and about 80% behenyl alcohol having a melting point of 60–65° C. were reacted to an acid value of 23.2. The product was a gray-brown hard wax, melting point 76° C., which when emulsified and spread formed films which were hazy, greasy and deficient in leveling characteristics. The undesirable attributes of this product were believed to be caused by the use of monohydric alcohols of chain lengths substantially shorter than those contemplated by the present invention.

*Example (d)*

Using the procedural technique of Example (a) a polyester composition was prepared from 51.5 grams of sebacic acid and 46.25 grams of 1,10 decanediol. The light tan composition had an acid value of 11.6 and molecular weight of 4850. It had a needle penetration value of 2 and a Durran softening point of 74° C., considerably under that of carnauba wax and the compositions of the present invention.

*Example (e)*

54 grams of adipic acid, 38.5 grams of 1,6 hexanediol and 11.9 grams of Adol 67 were reacted in accordance with the technique of Example (a). Adol 67 is a commercial mixture of 14 to 22 carbon atom alcohols in the following percentages: 15% cetyl alcohol, 30% stearyl alcohol, 25% behenyl alcohol and 30% arachidyl alcohol. The composition was a white wax-like material which tore when buffed with a cotton cloth. It formed a poor emulsion which when spread had poor leveling characteristics. The inferiority of this product over the compositions of the instant invention are attributed to the monohydric alcohols of chain lengths less than those contemplated by the present invention.

Example (f)

25.2 grams of the acidic oxidation product obtained by chromic acid oxidation of sugar cane alcohols, 43.7 grams of 1,10 decanediol and 49.0 grams of sebacic acid were reacted for a period of three hours at a temperature of between 180–220° C. The product had an acid value of 19.9, molecular weight of 2820 and a melting point of 74° C., and needle penetration of 1. The product was tan, somewhat crystalline wax and had a tendency to tear when buffed.

An emulsion was prepared using 35.2 grams of the polyester product of this example, 6.0 grams oleic acid, 4.0 grams morpholine, 1.0 grams of polyoxyethylene oleyl ether and 316 grams of water. The emulsion was spread upon half of a 3 foot by 3 foot yellow vinyl test panel. A product of Example 1 similarly emulsified was spread on the other half of the test panel. Both portions were permitted to dry and exposed to foot traffic of approximately 1,000 persons per day for 13 days. The panel was then removed, mopped with a damp cloth to remove the loose dirt. That portion of the panel coating covered with the composition of this example was much more badly scuffed and more dirty than was the adjacent panel covered with the emulsion prepared with the waxy polyester of Example 1. This difference in performance is apparently due to the more soft and tacky character of the composition containing cane wax acids.

Example (g)

A mixture of 60.5 grams of cetyl alcohol, 74 grams of phthalic anhydride and 23.5 grams of glycerol was heated at 250° C. for fifteen minutes. The temperature was then raised to 270° C. and held at that point for 25 minutes. When cooled the product formed was found to be a viscous balsam or resinous material which would be entirely unsuited for use in the preparation of an emulsifiable wax coating composition. It had a melting point of only about 12° C.

Example (h)

A mixture of 60 grams of cetyl alcohol, 60 grams of glycerol and 148 grams of phthalic anhydride was heated at 250° C. for 20 minutes and cooled. The product was hard, brittle and resinous in nature. It had an acid value of about 7.0 and a softening point of about 91° C. Because of its hardness and brittleness it was unsuitable for use in a wax emulsion coating composition. The hardness is attributed to the non-linearity of the composition. Crosslinking obviously resulted in the formation of the composition through the third glycerol hydroxyl groups.

What is claimed is:

1. New synthetic emulsifiable waxy linear polyesters of (1) a non-branched polymethylene glycol having from 4 to about 15 carbon atoms, (2) a non-branched aliphatic dicarboxylic acid having from 4 to about 15 carbon atoms and (3) a saturated straight chain aliphatic monohydric alcohol having at least 26 carbon atoms, said polyesters containing only carbon, hydrogen and oxygen, and having a melting point of at least 80° C., an acid value of from about 10 to about 50, and a needle penetration value of not greater than 5, the proportions of (1), (2) and (3) being substantially $n$ mols of said glycol, $n$ plus 1 mols of said dicarboxylic acid and 1 mol of said alcohol, $n$ having a value of from 2 to 30, said polyester molecules being terminated predominantly with carboxyl and alkyl groups in substantially equal proportions.

2. New synthetic emulsifiable waxy linear polyesters in accordance with claim 1 wherein said linear polyesters have a molecular weight of from about 1,200 to about 6,000.

3. New synthetic emulsifiable waxy linear polyesters in accordance with claim 1 wherein said dicarboxylic acid is adipic acid.

4. New synthetic emulsifiable waxy linear polyesters in accordance with claim 1 wherein said dicarboxylic acid is azelaic acid.

5. New synthetic emulsifiable waxy linear polyesters in accordance with claim 1 wherein said dicarboxylic acid is sebacic acid.

6. New synthetic emulsifiable waxy linear polyesters in accordance with claim 1 wherein said glycol is 1,10 decanediol.

7. New synthetic emulsifiable waxy linear polyesters in accordance with claim 1 wherein said glycol is 1,12 decanediol.

8. New synthetic emulsifiable waxy linear polyesters of (1) a non-branched polymethylene glycol having from 4 to about 15 carbon atoms, (2) a non-branched aliphatic dicarboxylic acid having from 4 to about 15 carbon atoms and (3) a mixture of straight chain aliphatic monohydric alcohols said alcohols having an average of at least 26 carbon atoms with not more than 5% of the alcohol molecules having less than 26 carbon atoms, said polyesters containing only carbon, hydrogen and oxygen, and having a melting point of at least 80° C., an acid value of from about 10 to about 50 and a needle penetration value of not greater than 5, the proportions of (1), (2) and (3) being substantially $n$ mols of said glycol, $n$ plus 1 mols of said dicarboxylic acid and 1 mol of said alcohol, $n$ having a value of from 2 to 30, said polyester molecules being terminated predominantly with carboxyl and alkyl groups in substantially equal proportions.

9. A self-lustering protective coating composition comprising water and a film forming agent, the film forming agent including emulsifiable waxy linear polyesters of (1) a non-branched polymethylene glycol having from 4 to about 15 carbon atoms, (2) a non-branched polymethylene dicarboxylic acid having from 4 to about 15 carbon atoms and (3) a straight chain aliphatic monohydric alcohol having from 26 to about 45 carbon atoms, said polyesters containing only carbon, hydrogen and oxygen, and having a melting point of at least about 80° C. and an acid value of from about 10 to about 30, the proportions of (1), (2) and (3) being substantially $n$ mols of said glycol, $n$ plus 1 mols of said dicarboxylic acid and 1 mol of said alcohol, $n$ having a value of from 2 to 30 said polyester molecules being terminated predominantly with carboxyl and alkyl groups in substantially equal proportions.

10. An aqueous synthetic wax emulsion in accordance with claim 9 wherein the hydrocarbon straight chain saturated monohydric alcohol has an average of at least about 30 carbon atoms with no more than 5% of the alcohol molecules having less than 26 carbon atoms.

11. A process for the preparation of a synthetic emulsifiable wax which comprises reacting (1) a non-branched polymethylene glycol having from 4 to about 15 carbon atoms, (2) a non-branched aliphatic dicarboxylic acid having from 4 to about 15 carbon atoms and (3) a saturated straight chain aliphatic monohydric alcohol having at least 26 carbon atoms, said reactants containing only carbon, hydrogen and oxygen, in molar proportions of $n$ mols of said glycol, $n$ plus 1 mols of said dicarboxylic acid and 1 mol of said alcohol, $n$ having a value of from 2 to 30, at a temperaure of about 150° C. to about 250° C. for a period of from about 3 to about 11 hours.

References Cited in the file of this patent

UNITED STATES PATENTS

| | | |
|---|---|---|
| 2,035,528 | Brubaker | Mar. 31, 1936 |
| 2,295,165 | De Groote | Sept. 8, 1942 |

FOREIGN PATENTS

| | | |
|---|---|---|
| 881,823 | France | Feb. 4, 1943 |